(12) United States Patent
Leutgeb et al.

(10) Patent No.: US 9,104,899 B2
(45) Date of Patent: Aug. 11, 2015

(54) MULTIPLE TRANSCEIVERS OPERABLE AS A SINGLE TRANSCEIVER

(75) Inventors: Thomas Leutgeb, Lieboch (AT); Dietmar Scheiblhofer, Kaindorf (AT)

(73) Assignee: Infineon Technologies AG, Neubiberg (DE)

( * ) Notice: Subject to any disclaimer, the term of this patent is extended or adjusted under 35 U.S.C. 154(b) by 979 days.

(21) Appl. No.: 12/191,061

(22) Filed: Aug. 13, 2008

(65) Prior Publication Data

US 2010/0038415 A1  Feb. 18, 2010

(51) Int. Cl.
*G06K 7/00* (2006.01)
*G06K 7/10* (2006.01)
*G06K 19/07* (2006.01)

(52) U.S. Cl.
CPC .......... *G06K 7/0008* (2013.01); *G06K 7/10019* (2013.01); *G06K 7/10039* (2013.01); *G06K 7/10108* (2013.01); *G06K 7/10297* (2013.01); *G06K 19/0723* (2013.01)

(58) Field of Classification Search
CPC .......... G06K 19/0723; G06K 7/10039; G06K 19/07749; G06K 7/10019; G06K 7/10297; G06K 7/10108

USPC .......................................... 235/492; 340/10.1
See application file for complete search history.

(56) References Cited

U.S. PATENT DOCUMENTS

| | | | |
|---|---|---|---|
| 6,378,774 B1 * | 4/2002 | Emori et al. .................. | 235/492 |
| 6,388,628 B1 * | 5/2002 | Dettloff et al. ................ | 343/742 |
| 7,250,863 B2 * | 7/2007 | Nemoto et al. ............ | 340/572.1 |
| 2003/0214389 A1 * | 11/2003 | Arneson et al. ............. | 340/10.1 |
| 2004/0025021 A1 * | 2/2004 | Aikawa et al. ................ | 713/172 |
| 2004/0046642 A1 * | 3/2004 | Becker et al. ............. | 340/10.32 |
| 2006/0049258 A1 * | 3/2006 | Piikivi .......................... | 235/451 |
| 2007/0210923 A1 * | 9/2007 | Butler et al. ............... | 340/572.8 |

FOREIGN PATENT DOCUMENTS

JP  2002183695 A  *  6/2002  ............. G06K 19/07

OTHER PUBLICATIONS

English Translation of JP 2002183695 A.*
English Translation of JP 2002183695 published Jun. 2002; translation retrieved Apr. 2013.*

* cited by examiner

*Primary Examiner* — Christopher Stanford
(74) *Attorney, Agent, or Firm* — Schiff Hardin LLP

(57) ABSTRACT

A communication system including a first transceiver having a user identification; and a second transceiver having the same user identification as the first transceiver, wherein the first and second transceivers operate in tandem.

12 Claims, 3 Drawing Sheets

MULTIPLE TRANSCEIVERS OPERABLE AS A SINGLE TRANSCEIVER

FIELD OF THE INVENTION

The present invention relates generally to a communication system, and more specifically to a communication system having tandem transceivers.

BACKGROUND

A contactless communication system has a reader and at least one contactless card. Communication protocols between the reader and the contactless card have been described in, for example, International Organization for Standardization (ISO) standards 14443, 15693, and/or 18000.

Each contactless card, also known as a chip card, smart card, RFID tag, or proximity IC card (PICC), typically has a single chip with a memory, which stores a unique user identification (UID) and data, and a radio transceiver or transponder with an antenna.

The reader, also called an interrogator, is a higher-power transceiver having a larger antenna to interrogate the contactless card with an interrogation or carrier signal. It is also possible for the reader to write to the contactless card and change the contactless card's data.

When the reader is turned on, the contactless card transmits its UID and possibly data by modulating a carrier signal received from the reader. Binary pulses representing the UID and data modify the impedance of the contactless card's antenna, which in turn causes an amplitude shift in the carrier signal. This process loads and unloads the contactless card antenna to reflect an impedance back into the reader antenna via the modulated carrier signal. This modulated carrier signal is then peak-detected at the reader and reshaped into a serial data signal.

Contactless communication systems feature anti-collision resolution, as multiple contactless cards transmitting simultaneously within the reader's antenna field can interfere with one another. Many available schemes prevent such collisions. One scheme uses a time-division multiplexed arrangement, assigning each contactless card a time slot in which to transmit. Also, collisions can be resolved by muting all contactless cards except the contactless card being read to ensure that no collision occurs. After a certain period of time, the muted contactless cards are reactivated.

It is difficult, if not impossible, to add physical memory to or change the contactless card's features in the field. The result is a manufacturer's choice between equipping the contactless card with a smaller memory and/or having fewer features, risking the contactless card may not meet future requirements, and equipping the contactless card with a larger memory and/or additional features, risking the initial version of the contactless card being more expensive than necessary.

DETAILED DESCRIPTION OF THE INVENTION

The present invention provides a communication system including a first transceiver having a user identification, and a second transceiver having the same user identification as the first transceiver. Since the two transceivers have the same user identification, a reader operates with both transceivers in tandem, as if they were a single transceiver.

Figure 1:
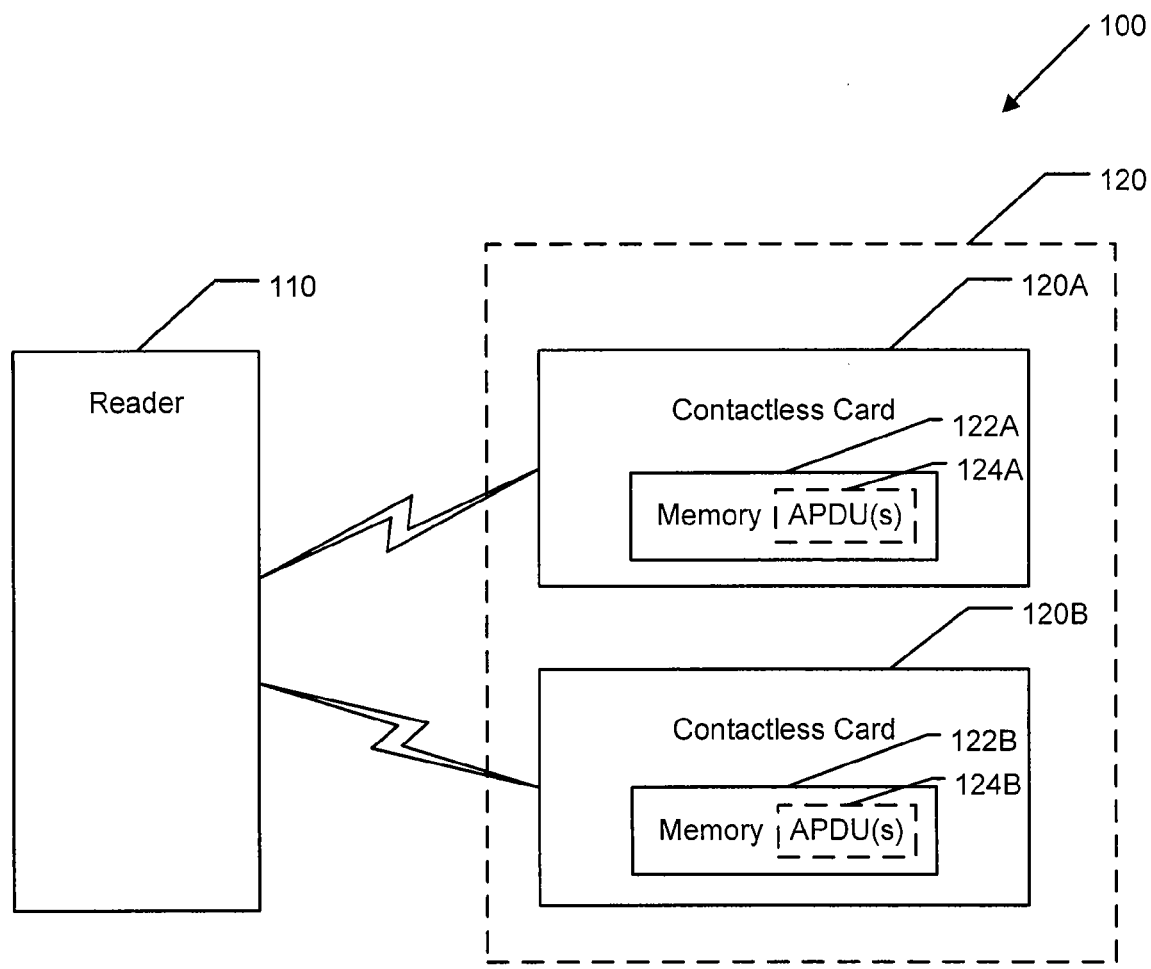
FIG. 1 illustrates a contactless communication system in accordance with an embodiment of the present invention.

FIG. 1 illustrates a contactless communication system 100 in accordance with an embodiment of the present invention.

Communication system 100 includes reader 110, first contactless card 120A, and second contactless card 120B. Although only two contactless cards 120A, 120B are shown for the sake of simplicity, the communication system 100 can include any number of contactless cards.

First contactless card 120A has memory 122A, which stores a user identification (UID) and data, such as one more Application Protocol Data Units (APDUs) 124A. An APDU is a communication unit between reader 110 and card 120A. There are two categories of APDUs: command APDUs and response APDUs. As the name implies, a command APDU (not shown) is sent by reader 110 to card 120A, and contains a mandatory header and data. A response APDU is sent by card 120A to reader 110, and it contains a mandatory status word and data. The term "data" is not intended to be limiting, as data may include any form of commands and/or information.

Second contactless card 120B is similar to first contactless card 120A in that it has memory 122B which stores a UID and data, such as one more APDUs 124B.

Figure 2:
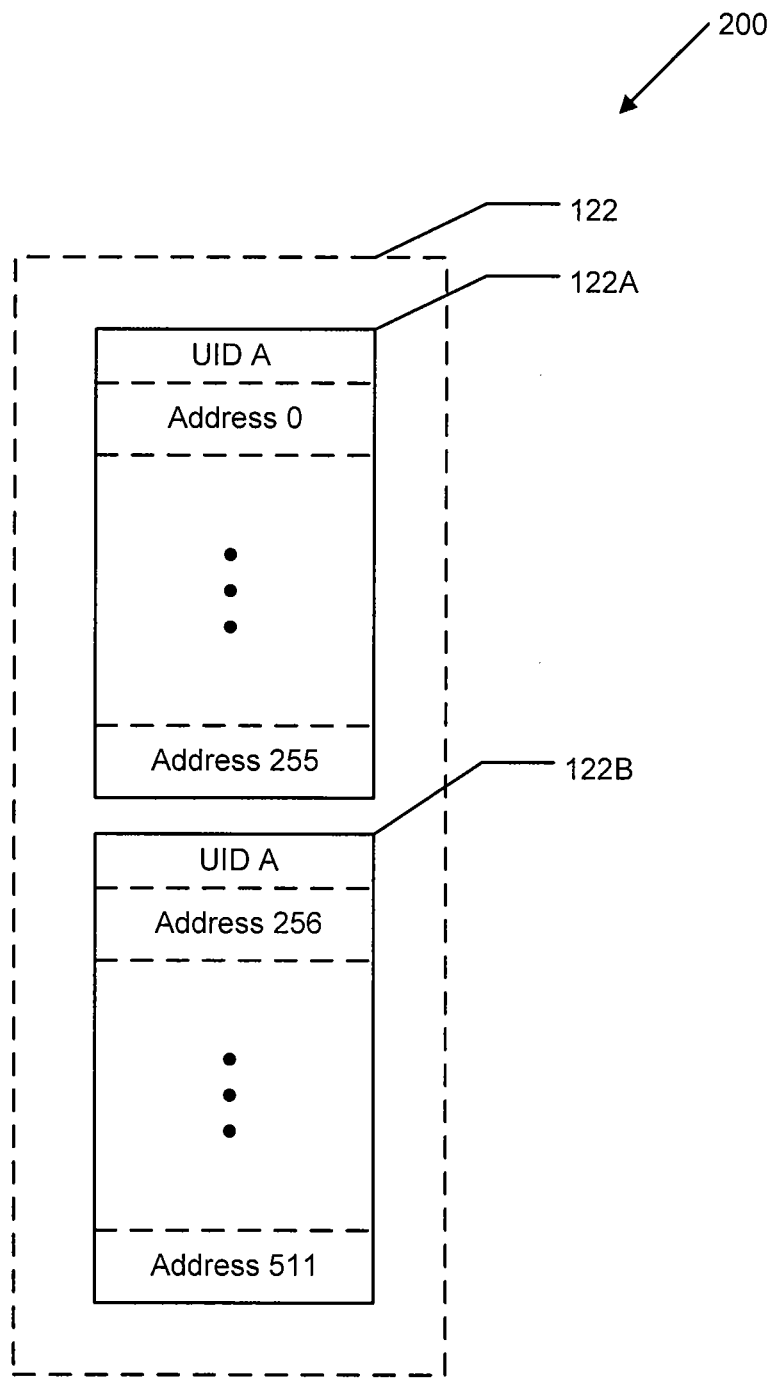
FIG. 2 is a detailed illustration of contactless card memories of the contactless communication system of FIG. 1.

FIG. 2 is a detailed illustration of card memories 122A, 122B of the contactless communication system of FIG. 1.

Second contactless card 120B can be configured to operate in tandem with first contactless card 120A, such that reader 110 sees the two contactless cards 120a, 120B as a single card 120. To accomplish this, second contactless card 120B is configured such that it has the same UID as first card 120A. For the sake of illustration, the UID is shown in FIG. 2 as "UID A". It is important to note that these cards 120A, 120B need not be connected physically; they need only both be located within the interrogation field of reader 110.

Both of cards 120A, 120B have the same UID, and therefore they will respond to reader 110 in the same time slot. After reader 110 starts the anti-collision process, reader 110 interacts with contactless cards 120A, 120B as if they were a single contactless card 120 by selecting both cards 120A, 120B at once using the same UID A. Although the cards 120A, 120B are physically separate cards, they are logically a single card 120.

In an exemplary embodiment, the invention is used to increase the effective amount of memory 122A of first contactless card 120A, such as in a case where a customer runs out of memory in an existing contactless card 120A. This is accomplished by configuring the contactless cards 120 such that they have the same UID and memory addresses that do not overlap. More specifically, second contactless card 120B is configured to have the same UID A as first contactless card 120A. Also, memory 122B of the second contactless card 120B is configured to start its memory addresses with a certain memory offset with respect to first contactless card memory 122A. In the example shown in FIG. 2, first contactless card memory 122A is configured to have memory addresses 0-255, second contactless card memory 122B is configured to have a memory offset of 256, such that it is configured to have memory addresses 256-511. Therefore, when accessing contactless card memories 122A, 122B, the lower address block (0-255) addresses first contactless card memory 122A, and the higher address block (256-511) addresses second contactless card memory 122A. The two contactless card memories 122A, 122B operate in tandem such that they appear to reader 110 as if they are a single contactless card memory 122 with double capacity.

While in the example provided contactless card memories 122A, 122B have been described as being of a certain size, the invention is not limited in this respect. Contactless card memories operating in tandem may be of any size, and may have different sizes.

Also, in the example provided, contactless card memories 122A, 122B have been described as having consecutive memory address ranges, however, the invention is not limited in this respect either. Contactless card memories 122A, 122B may be configured to have any respective memory addresses or ranges, provided memory addresses in memories 122A, 122B do not overlap and lead to differing transmissions to reader 110. If for any reason memory addresses do overlap, there should be same transmissions resulting from the overlapping memory addresses so as to avoid confusion by reader 110.

In another exemplary embodiment the invention is used to add to the feature set of first contactless card 120A, such as when a customer wishes to add a security feature to an existing contactless card. This is accomplished by configuring second contactless card 120B to have the same UID as an existing first contactless card 120A, as described above, and second contactless card 120B to have one or more APDUs not supported by first contactless card 120A. Again, such APDUs could be related to security features, but the invention is not limited in this respect.

By way of example, first contactless card 120A may support APDUs 1, 2, and 3, and second contactless card 120B may support APDUs 5, 6, and 7. After second contactless card 120B is configured to operate in tandem with first contactless card 120A, reader 110 sees first contactless card 120A and second contactless card 120B as being a single contactless card 120 having APDUs 1, 2, 3, 5, 6, and 7.

It is preferable if contactless cards operating in tandem do not have any overlapping APDUs. However, if any APDUs do overlap, the overlapping APDUs should respond to reader 110 in the same manner so as to not result in conflicting responses.

In operation, if a contactless card 120A operating in tandem with any other contactless cards does not recognize a particular command APDU or memory address, it will be mute by default. Alternatively, a contactless card 120A operating in tandem can be configured to remain mute for certain memory addresses or APDUs, particularly for memory addresses and/or APDUs supported by another contactless card with which it is operating in tandem.

Figure 3:
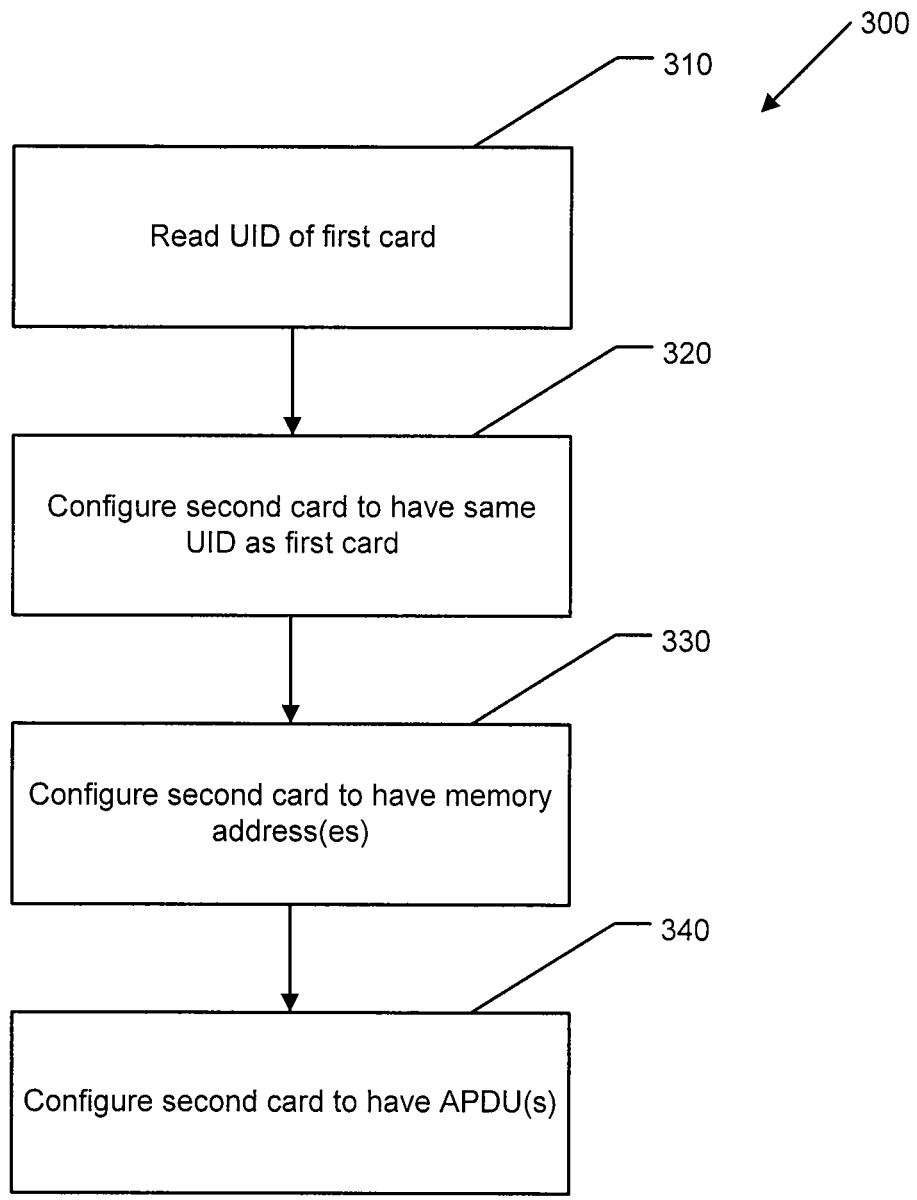
FIG. 3 illustrates a method of configuring a contactless communication system in accordance with an embodiment of the present invention.

FIG. 3 illustrates a method of configuring a contactless communication system in accordance with an embodiment of the present invention. By performing this method, a plurality of contactless cards may be configured to operate in tandem, so that reader 110 sees the plurality of contactless cards as a single contactless card.

In configuring the system, first the UID of first contactless card 120A is read. (Step 310.)

Second contactless card 120B is then configured to have the same UID as first contactless card 120A. (Step 320.) This step is generally, but not necessarily, accomplished during a configuration phase of second contactless card 120B. Because the first and second contactless cards 120A, 120B have the same UID, reader 110 addresses the cards in tandem, and both cards respond together in a same time slot.

Memory 122B of second contactless card 120B is then configured to have a different memory address range than first contactless card memory 122A. The contactless cards 120A, 120B are configured to have different memory addresses so that reader 110 does not receive conflicting responses from a same memory address used in both contactless cards. In the example as provided above, a lower memory address range (0-255) addresses first contactless card memory 120A, and a higher memory address range (256-511), starting at the offset memory address 256, addresses second memory 122A. (Step 330.)

Second contactless card 120B may optionally be configured to have additional, and preferably different, APDU(s) 124B so as to add to the feature set of first contactless card 120A. (Step 340.) Again, additional APDUs in second card 120B can be used to add security and/or other features to existing first contactless card 120A.

One of ordinary skill would appreciate that the steps shown in FIG. 3 need not necessarily be performed in the order shown. The steps may be performed in any order suitable for the intended purpose.

Also, it is also appreciated that the method illustrated in FIG. 3 does not necessarily require both Steps 330 and 340. The method may include Step 330 without Step 340, Step 340 without Step 330, or may both Steps 330 and 340.

The present invention provides numerous advantages. For example, system 100 has scaleable memory size in that an existing contactless card can be upgraded to expand its memory. Also, system 100 has scaleable feature sets in that an existing contactless card can be upgraded to expand its feature set. Depending on application needs, a customer can select any number of contactless cards to be operated in tandem.

Although the invention has been described as having two contactless cards 120A, 120B in tandem, the invention is not limited in this respect. Communication system 100 can have any number of tandem contactless cards, provided there is enough electromagnetic field strength to support the contactless cards.

While the application has been described in terms of communication system 100 having a card, the application is not limited to this device being in a form of a card. Card may be any form of user device suitable for the intended purpose.

Communication system 100 is not limited to any particular form of contactless or electromagnetic communication and/or connection. The contactless connection between reader 110 and each card 120A, 120B may be based on, for example, radio waves, microwaves, terahertz radiation, infrared radiation, visible light, ultraviolet radiation, X-rays, gamma rays, Bluetooth, or any other form of contactless connection suitable for the intended purpose.

While communication system 100 is described as being contactless, it may alternatively be contact-based. Such a contact-based communication system is similar to contactless communication system 100 described above, except that reader 110 and cards 120A, 120B are coupled via a contact connection rather than a contactless connection. The contact connection may be, for example, a USB port, serial port, card drive, or any other contact connection suitable for the intended purpose. Contact-based communication system 100 is otherwise similar to contactless communication system 100. Since in light of the description of the contactless communication system 100 one of ordinary skill would appreciate how such a contact-based communication system would function, for the sake of brevity, a description will not be provided here.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A communication system comprising:
    a first transceiver having a transceiver identifier and a first set of memory addresses of a first memory configured to store data; and
    a second transceiver having the same transceiver identifier as the first transceiver and a second set of memory addresses of a second memory configured to store data, the second set of memory addresses being at a predetermined offset with respect to the first set of memory addresses,
    wherein the first transceiver supports a first set of application protocol data units (APDUs), and the second transceiver supports a second set of APDUs having no APDUs in common with the first transceiver, and the first and second sets of APDUs conform to ISO 14443 and/or 15693, and
    wherein the first and second transceivers are operable as a single transceiver and the first and second memories are operable to appear within the communication system as being a single, physical memory when transmitting to another transceiver.

2. The communication system of claim 1, wherein the first and second sets of memory addresses have no addresses in common.

3. The communication system of claim 1, further comprising one or more additional transceivers having the same transceiver identifier as the first transceiver.

4. The communication system of claim 1, wherein the first and second transceivers are contactless transceivers.

5. The communication system of claim 4, wherein the first and second contactless transceivers are contactless communication cards.

6. The communication system of claim 1, wherein the first and second transceivers are contact-based transceivers.

7. The communication system of claim 1, wherein the first transceiver is a contactless transceiver, and the second transceiver is a contact-based transceiver.

8. The communication system of claim wherein at least one of the APDUs is a security APDU.

9. A communication system comprising:
    a first transceiver having a transceiver identifier and a first set of memory addresses of a first memory configured to store data;
    a second transceiver having the same transceiver identifier as the first transceiver and a second set of memory addresses of a second memory configured to store data, the second set of memory addresses being at a predetermined offset with respect to the first set of memory addresses,
    wherein the first transceiver supports a first set of application protocol data units (APDUs), and the second transceiver supports a second set of APDUs having no APDUs in common with the first transceiver, and the first and second sets of APDUs conform to ISO 14443 and/or 15693; and
    a reader configured to communicate with the first and second transceivers,
    wherein the first and second transceivers are operable as a single transceiver and the first and second memories are operable to appear within the communication system as being a single, physical memory when transmitting to a reader.

10. The communication system of claim 9, wherein the first and second transceivers are contactless communication cards.

11. A method of configuring a contactless communication system, comprising:
    reading a contactless card identifier of a first contactless card having a first set of memory addresses of a first memory configured to store data; and
    configuring a second contactless card to have the same contactless card identifier as the first contactless card and to have a second set of memory addresses of a second memory configured to store data, the second set of memory addresses being at a predetermined offset with respect to the first set of memory addresses,
    wherein the first contactless card supports a first set of application protocol data units (APDUs), and a second contactless card supports a second set of APDUs having no APDUs in common with the first contactless card, and the first and second sets of APDUs conform TO ISO 14443 and/or 15693; and
    wherein the first and second contactless cards are operable as a single contactless card and the first and second memories are operable to appear within the communication system as being a single, physical memory when transmitting to a reader.

12. The method of claim 11, further comprising:
    configuring the first contactless card to be mute when the second contactless card is communicating with a reader.

* * * * *